Patented Apr. 4, 1950

2,503,196

UNITED STATES PATENT OFFICE 2,503,196

BIS-PHENOLS

Andrew J. Dietzler and Fred Bryner, Midland, Mich., assignors to The Dow Chemical Company, Midland, Mich., a corporation of Delaware No Drawing. Application March 30, 1949,
Serial No. 84,468

4 Claims. (Cl. 260—619)

This invention is directed to new bis-phenol compounds having the formula

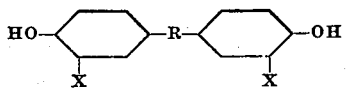

wherein each X represents hydrogen or an alkyl radical containing from 1 to 3 carbon atoms, inclusive, and R represents a cyclohexyl substituted alkane structure, and wherein the benzene rings are both attached to the same carbon atom of the aliphatic chain of the alkane structure. These compounds are white crystalline solids or viscous liquids somewhat soluble in many common organic solvents, relatively insoluble in water, stable in the presence of dilute acids, and soluble in dilute aqueous alkali. The compounds have been found valuable in the preparation of more complex organic derivatives, as constituents of veterinary medicines, and as fungistats.

The compounds of the invention may be prepared by reacting a cyclohexyl substituted aliphatic ketone with phenol or a phenol substituted in the ortho position by a lower alkyl radical, in the presence of a sulfur containing catalyst and an acid acting condensing agent. Best results are obtained when a molecular excess of phenol to ketone is employed. In practice, 4 mols or more of the phenol commonly is employed per mol of ketone. Good results are obtained with such reaction mixture when employing about 0.3 to 0.5 mol of anhydrous hydrogen chloride as condensing agent in the presence of about .2 mol of hydrogen sulfide or a small amount of normalbutyl mercaptan as catalyst.

In carrying out the reaction, the ketone and phenol are mixed together along with the sulfur containing catalyst. The condensation is thereafter accomplished by introducing the anhydrous hydrogen chloride portionwise into the reaction mixture with stirring, the temperature being maintained at below 40°– 50° C. The condensation begins immediately upon the introduction of the hydrogen chloride with the formation of the desired bis-phenol compound and water of reaction. The rate of condensation is slow and the reaction is not strongly exothermic. A substantial degree of reaction is accomplished within a few hours, but best yields have been obtained by permitting the reaction mixture to stand for at least several days at room temperature before attempting the separation of the desired bis-phenol product. Any of the conventional methods of separation may be employed including various combinations of steps such as dissolving the reaction mixture in water immiscible solvent, repeated washing of the solvent solution in water, fractionally distilling under reduced pressure, steam distillation, and recrystallization.

An alternate procedure includes reacting phenol or a suitable ortho-alkyl phenol with a cyclohexyl-lower aliphatic aldehyde in the presence of anhydrous hydrogen chloride as a condensing agent. Here an inert liquid such as chlorobenzene is conveniently employed as reaction solvent. Best results are obtained when a large molecular excess of phenol is present in the reaction zone, and the temperature of the reaction mixture is maintained at between about 20° and 40° C. When the reaction is completed, the solvent and excess phenol may be recovered by fractional distillation, and the residual bis-phenol compound recovered in accordance with the conventional procedures set forth above.

The cyclohexyl substituted aliphatic ketones employed in accordance with the present invention are in part known to the art. These compounds may be produced by the destructive distillation of mixtures of cyclohexyl substituted aliphatic acids with barium hydroxide and barium acetate under reduced pressure. Several representative preparations are later described.

The following examples illustrate the invention but are not to be construed as limiting.

Example 1.—4,4'-(4-cyclohexyl-1-methyl-butylidene) bis-(2-isopropylphenol)

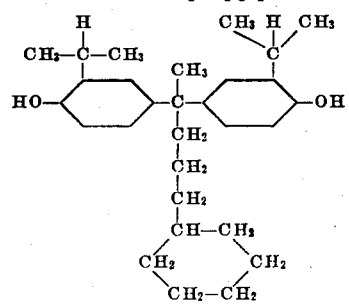

21.2 grams (0.125 mol) of 5-cyclohexyl-2-pentanone, 85.1 grams (0.625 mol) of 2-isopropyl phenol and 1 gram of normalbutyl mercaptan were mixed together in a glass reactor equipped with agitator and inlet tubes for the introduction of gaseous reactants. 21 grams of anhydrous hydrogen chloride was introduced portionwise below the surface of the mixture with agitation and cooling over a period of 18 minutes, the temperature of the reaction mixture ranging between 10° and 19° C. during the introduction. The resulting mixture was allowed to stand for 3 days at 25° C. and thereafter warmed and stirred at 70° C. to vaporize out residual hydrogen chloride. The crude product was then fractionally distilled under reduced pressure to separate traces of water and unreacted ketone and phenol boiling at up to a pot temperature of 180° C. at 25 millimeters pressure. The residue was blown at 25 millimeters pressure with 100 grams of steam at 160°–170° C. and thereafter dried at 160°–170° C. under 10 millimeters pressure. 47 grams of a light resinous product was thereby obtained. This material was recrystallized from petroleum ether (boiling range of 77°–115° C.) to obtain 4,4'-(4-cyclohexyl-1-methyl-butylidene) bis-(2-isopropylphenol) as a cream colored crystalline compound melting at 123.2°–124.9° C. and completely soluble in dilute sodium hydroxide. This compound contained 81.77 per cent of carbon and 10.25 per cent of hydrogen by analysis.

The 5-cyclohexyl-2-pentanone employed as a reactant is a mobile liquid boiling at 138° C. at 67 millimeters pressure. This compound was prepared by subjecting a mixture of 4-cyclohexyl-butyric acid, barium acetate and barium hydroxide to destructive distillation in an iron pot and at 100 millimeters pressure.

*Example 2.—4,4'-(4-cyclohexyl-1-methyl-butylidene) bis-phenol*

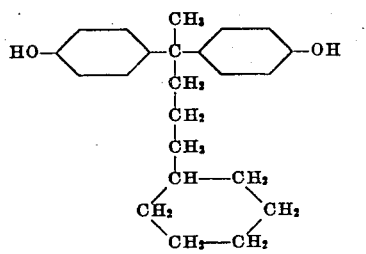

In a similar fashion 84.6 grams (0.5 mol) of 5-cyclohexyl-2-pentanone and 235.3 grams (2.5 mols) of molten phenol were mixed together in a glass reaction vessel. The phenol-ketone mixture was cooled to 21° C. and 4.6 grams of gaseous hydrogen sulfide bubbled into and below the surface of the reaction mixture and with agitation over a period of 10 minutes. Agitation was continued and 16 grams of anhydrous hydrogen chloride introduced below the surface of the mixture with stirring and cooling over a period of 27 minutes. During the latter addition, the temperature gradually rose from 21° to 27° C.

The crude reaction product was allowed to stand for 48 hours at 25° C. and the resulting orange-red crystalline mixture then dissolved in 300 milliliters of hot chlorobenzene and washed 3 times with 100 milliliter portions of water at 60°–70° C. The mixture was then fractionally distilled under reduced pressure to a pot temperature of 160° C. at 2 millimeters pressure to remove all low boiling constitutents and obtain 165 grams of the desired product as a brown crystalline residue soluble in dilute aqueous sodium hydroxide. This crude product was purified by recrystallization from chlorobenzene to obtain 4,4'-(4-cyclohexyl-1-methyl-butylidene) bis-phenol as a white crystalline product melting at 154.3°–154.7° C. This compound contained 81.18 per cent carbon and 8.98 per cent hydrogen by analysis.

*Example 3.—4,4'-(2-cyclohexyl-ethylidene) bis-phenol*

235.3 grams (2.5 mols) of phenol was dissolved in 100 milliliters of chlorobenzene and placed in the reactor described in the previous examples. 3.3 grams of anhydrous hydrogen chloride was bubbled into the solution at 22° C., and 63 grams (0.5 mol) of cyclohexyl-acetaldehyde and 11 grams additional anhydrous hydrogen chloride added portionwise and with stirring to the reaction mixture over a period of 20 minutes at 22°–34° C. The mixture crystallized and was allowed to stand for 16 hours at 25° C. At the end of this time the chlorobenzene and unreacted phenol were recovered by fractionally distilling the crude product to a pot temperature of 165° C. at 25 millimeters pressure. The residue was blown with 30 grams of steam at 155°–165° C. under 50 millimeters pressure and thereafter dried to obtain 143.2 grams of a light red product completely soluble in aqueous caustic. This product was recrystallized from benzene to obtain 4,4'-(2-cyclohexyl-ethylidene)bis-phenol as a cream colored crystalline solid melting at 146.5°–147.3° C. Upon analysis the compound was found to contain 80.52 per cent of carbon and 8.15 per cent of hydrogen, both by weight.

The cyclohexyl-acetaldehyde employed as a reactant was prepared by the catalytic oxidation of beta-cyclohexyl-ethanol.

While the foregoing examples have been primarily concerned with bis-phenol derivatives produced from phenol and 2-isopropylphenol, it is to be understood that other lower alkyl phenols may be substituted for those shown to obtain homologous compounds. Thus 2-methylphenol, 2-ethylphenol or 2-normalpropyl phenol may be reacted with 5-cyclohexyl-2-pentanone to produce compounds falling within the scope of the present invention. Similarly, other cyclohexyl substituted aliphatic ketones and aldehydes may be reacted with the phenol or the lower alkyl phenols to obtain compounds of the general structural formula herein set forth.

We claim:

1. A bis-phenol compound having the formula

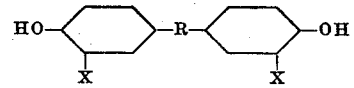

wherein X represents a member of the group consisting of hydrogen and alkyl radicals containing from 1 to 3 carbon atoms, inclusive, R represents a cyclohexyl substituted alkane structure, and wherein the benzene rings are both attached to the same carbon atom of the aliphatic chain of the alkane structure.

2. 4,4'-(4-cyclohexyl - 1 - methyl-butylidene)-bis-(2-isopropylphenol) melting at 123.2°–124.9° C.

3. 4,4'-(4-cyclohexyl - 1 - methyl-butylidene)-bis-phenol melting at 154.3°–154.7° C.

4. 4,4' - (2 - cyclohexyl-ethylidene)bis - phenol melting at 146.5°–147.3° C.

ANDREW J. DIETZLER.
FRED BRYNER.

No references cited.